(12) United States Patent
Sembo

(10) Patent No.: US 11,053,105 B2
(45) Date of Patent: Jul. 6, 2021

(54) CRANE VEHICLE

(71) Applicant: TADANO LTD., Kagawa (JP)

(72) Inventor: Hajime Sembo, Kagawa (JP)

(73) Assignee: TADANO LTD., Kagawa (JP)

( * ) Notice: Subject to any disclaimer, the term of this patent is extended or adjusted under 35 U.S.C. 154(b) by 154 days.

(21) Appl. No.: 16/343,607

(22) PCT Filed: Oct. 18, 2017

(86) PCT No.: PCT/JP2017/037762
§ 371 (c)(1),
(2) Date: Apr. 19, 2019

(87) PCT Pub. No.: WO2018/074532
PCT Pub. Date: Apr. 26, 2018

(65) Prior Publication Data
US 2019/0270624 A1    Sep. 5, 2019

(30) Foreign Application Priority Data
Oct. 21, 2016  (JP) .............................. JP2016-206821

(51) Int. Cl.
*B66C 23/88*    (2006.01)
*B66C 13/16*    (2006.01)
(Continued)

(52) U.S. Cl.
CPC .............. *B66C 23/88* (2013.01); *B66C 13/00* (2013.01); *B66C 13/16* (2013.01); *B66C 13/22* (2013.01); *B66C 15/00* (2013.01); *B66C 23/42* (2013.01); *B66C 23/701* (2013.01); *B66C 23/78* (2013.01); *B66C 23/82* (2013.01); *B66C 23/84* (2013.01);
(Continued)

(58) Field of Classification Search
CPC ....... B66C 23/88; B66C 23/905; B66C 15/00; B66C 15/065; B66C 13/00; B66C 13/16; B66C 13/22
See application file for complete search history.

(56) References Cited

U.S. PATENT DOCUMENTS 5,160,056 A    11/1992 Yoshimatsu et al.

FOREIGN PATENT DOCUMENTS

CN    202829346 U    3/2013
CN    203813893 U    9/2014
(Continued)

OTHER PUBLICATIONS

International Search Report issued in PCT Patent Application No. PCT/JP2017/037762 dated Jan. 16, 2018.
(Continued)

*Primary Examiner* — Michael R Mansen
*Assistant Examiner* — Juan J Campos, Jr.
(74) *Attorney, Agent, or Firm* — Marshall, Gerstein & Borun LLP

(57) ABSTRACT

A rough terrain crane is equipped with dashboard cameras and digital cameras for capturing bird's-eye view image thereof. The equipment performs, when a load factor reaching 90%, a process of recording start for starting image data recording with the digital camera and a process of storing measurement value for recording a load factor concurrently with the process of recording start. The image data is recorded with the digital camera associated with the above activation condition, among the digital cameras installed in the rough terrain crane.

4 Claims, 13 Drawing Sheets

| Category | Condition | | Camera for recording start |
|---|---|---|---|
| First condition | Load factor is greater than 90% | | All cameras |
| Second condition | Outriggers is uplifted | | All cameras |
| Third condition | Over-hoisting state Operation lever is manipulated to dangerous side | | Camera at distal end of boom Dashboard camera |
| Fourth condition | Recording start position for permissible working range is exceeded. | | All cameras |
| Fifth condition | Driving speed exceeds upper limit speed | Slewing speed | Right and left cameras in cabin, Camera at distal end of boom |
| | | Telescopic speed | Camera at distal end of boom |
| | | Derricking speed | Camera at distal end of boom |
| | | Hook motion speed | Camera at distal end of boom |

(51) Int. Cl.
*B66C 13/22* (2006.01)
*B66C 15/00* (2006.01)
*B66C 13/00* (2006.01)
*B66C 23/42* (2006.01)
*B66C 23/70* (2006.01)
*B66C 23/78* (2006.01)
*B66C 23/82* (2006.01)
*B66C 23/84* (2006.01)
*B66C 23/94* (2006.01)
*G07C 5/00* (2006.01)
*H04N 5/91* (2006.01)
*H04N 7/18* (2006.01)
*H04N 5/915* (2006.01)
*B66C 23/80* (2006.01)

(52) U.S. Cl.
CPC ............... *B66C 23/94* (2013.01); *G07C 5/00* (2013.01); *H04N 5/91* (2013.01); *H04N 5/915* (2013.01); *H04N 7/18* (2013.01); *B66C 23/80* (2013.01)

(56) References Cited

FOREIGN PATENT DOCUMENTS

| | | |
|---|---|---|
| JP | H01-147135 U | 10/1989 |
| JP | H07187581 A | 7/1995 |
| JP | H09-048584 A | 2/1997 |
| JP | H09-194188 A | 7/1997 |
| JP | H10-324497 A | 12/1998 |
| JP | 2000-159477 A | 6/2000 |
| JP | 2000281284 A | 10/2000 |
| JP | 2000-344470 A | 12/2000 |
| JP | 2001-328796 A | 11/2001 |
| JP | 2001-348189 A | 12/2001 |
| JP | 2002-128463 A | 5/2002 |
| JP | 3318130 B2 | 8/2002 |
| JP | 2006-199440 A | 8/2006 |
| JP | 2014-210625 A | 11/2014 |
| JP | 5692894 B2 | 4/2015 |
| RU | 2270162 C2 | 2/2006 |

OTHER PUBLICATIONS

International Preliminary Report on Patentability issued in PCT Patent Application No. PCT/JP2017/037762 dated May 2, 2019.
Extended European Search Report issued in European Patent Application No. 17863166.9 dated Jun. 5, 2020.

| Category | Condition | | Camera for recording start |
|---|---|---|---|
| First condition | Load factor is greater than 90% | | All cameras |
| Second condition | Outriggers is uplifted | | All cameras |
| Third condition | Over-hoisting state Operation lever is manipulated to dangerous side | | Camera at distal end of boom Dashboard camera |
| Fourth condition | Recording start position for permissible working range is exceeded. | | All cameras |
| Fifth condition | Driving speed exceeds upper limit speed | Slewing speed | Right and left cameras in cabin, Camera at distal end of boom |
| | | Telescopic speed | Camera at distal end of boom |
| | | Derricking speed | Camera at distal end of boom |
| | | Hook motion speed | Camera at distal end of boom |

FIG. 13

CRANE VEHICLE

TECHNICAL FIELD

The present invention relates to crane vehicles including a boom that is derrickable and telescopic.

BACKGROUND

A crane vehicle typically includes a lower carrier and an upper structure mounted thereon, in which the lower carrier is secured at a work site and the upper structure carries a hoisted load. The crane vehicle is provided with various safety devices for safety in work operations, and even if an operator performs an incorrect operation (applying an operation to a dangerous side) of the upper structure, carries the hoisted load only in a safe working area and controls so as to stop the operations in some cases. Meanwhile, there is also provided a means for releasing the above-described safety device. The reason why is that an operator may protect against danger more quickly by intentionally releasing the safety device as above to manually operate the upper structure in order to prevent danger during operation. However, in the case of this safety device being released or the like, an unexpected accident at work may cause, and in the event of an accident, an investigation of the causes of the accident has to be conducted.

A dashboard camera is installed in vehicles such as an automobile and a truck in recent years (see, for example, Japanese Patent No. 5692894). This dashboard camera includes a camera, in which an operating state of a vehicle is recorded chronologically, and in the event of an accident, the cause of the accident is investigated based on recorded images. In the crane vehicle such as a rough terrain crane, since a region (so-called blind spot) is caused in which an operator cannot visually recognize during traveling or the like, a device is installed that captures this region with a camera to provide on a display in real-time.

If the above-described dashboard camera or the device displaying the blind spot as above can record views of an upper structure during operation, it is possible to contribute to, in the event of an accident, an investigation of the causes of the accident.

However, a very large capacity storage and power consumption are required to continuously record image data of an operation from the beginning to the end, which is not practical from the viewpoint of cost.

SUMMARY OF THE DISCLOSURE

The present invention has been made in view of the aforementioned circumstances, and an object thereof is to provide a crane vehicle capable of analyzing a situation of an accident occurred during operation at low cost.

(1) A crane vehicle according to the present invention includes: a carrier; a slewing base slewably supported on the carrier; a boom supported by the slewing base in a derrickable and telescopic manner; a hook which is suspended from a distal end of the boom with a wire therebetween, and is configured to engage with a hoisted load; an outrigger which is disposed on the carrier, and is placed upon the ground so as to cause the carrier to have a stable posture; a slewing actuator to slew the slewing base; a telescopic actuator to extend and retract the boom; a derrick actuator to raise and lower the boom; a winch actuator configured to operate the wire so as to vertically move the hook; a slewing operation unit configured to operate the slewing actuator; a boom telescopic operation unit configured to operate the telescopic actuator; a boom derricking operation unit configured to operate the derrick actuator; a winch operation unit configured to operate the winch actuator; a load detection means for detecting a load being applied to the hook; a load at least one digital camera; a storage unit configured to store image data outputted by the digital camera; and a controller. The controller performs, when a predetermined measurement value meets a predetermined condition, a process of recording start which starts storing the image data in the storage unit, and a process of storing measurement value to store the predetermined measurement value in the storage unit, concurrently with the process of recording start.

With this configuration, image data recording with a digital camera starts when a predetermined measurement value meets a predetermined condition. The predetermined measurement value is recorded concurrently with this recording. Specifically, for example, a predetermined measurement value represents a load factor and a predetermined condition of the load factor is equal to 90%. Thus, for example, when a crane vehicle topples, the recorded image data is analyzed after toppling, and accordingly there are obtained a state of the crane vehicle toppling and a variation in the load factors before and after the toppling. Here, the load factor is defined as a percentage of a load weight of hoisted load obtained by suspension relative to suspendible maximum weight of the hoisted load.

(2) It is preferred that two or more digital cameras described above is installed. The storage unit can store the digital camera, which output image data to be stored when the predetermined measurement value meeting the predetermined condition, and the relevant predetermined condition in association with each other. The controller in the process of recording start, can start storing in the storage unit the image data outputted by the digital camera associated with the relevant predetermined condition, when the predetermined measurement value meeting the predetermined condition.

With this configuration, only image data is recorded with the specific camera corresponding to a condition of recording with the digital camera, which records relevant images and reduces capacity storage and power consumption.

(3) The predetermined measurement value represents a load factor which is defined as a percentage of a weight of hoisted load detected by the load detection means relative to suspendible maximum weight of the hoisted load, and the predetermined condition may include a condition of the load factor exceeding a predetermined threshold.

With this configuration, image data recording with the digital camera starts when the load factor exceeds the predetermined threshold. In addition, the load factor is stored concurrently with the image data recording. Thus, when an accident (such as crane vehicle toppling) occurs during operation, the image data is analyzed after the accident, and accordingly there are obtained a variation in the load factors before and after, and at the crane vehicle toppling.

(4) An uplift detection means may be further included, which detects that the outrigger leaves the ground. When so configured, the predetermined measurement value represents information on whether the outrigger leaves the ground is detected by the uplift detection means and a load factor which is defined as a percentage of a weight of hoisted load detected by the load detection means relative to suspendible maximum weight of the hoisted load, and the predetermined condition can include a condition in which the outrigger leaves the ground is detected by the uplift detection means.

With this configuration, image data recording with the digital camera starts when the outrigger leaves the ground. In addition, the information on whether the outrigger leaves the ground and the load factor are stored concurrently with the image data recording. Thus, when an accident (such as crane vehicle toppling) occurs during operation, the image data is analyzed after the accident, and accordingly there are obtained each variation in the spaced states of outrigger and in the load factors before and after, and at the crane vehicle toppling.

(5) An over-hoisting detection means may be further included, which detects the distance of the hook from the distal end of the boom becomes equal to or less than a predetermined length. When so configured, the predetermined measurement value represents information on whether the distance of the hook from the distal end of the boom is equal to or less than the predetermined length, an operational orientation and an operation quantity for the boom telescopic operation unit, an operational orientation and an operation quantity for the boom derricking operation unit, and an operational orientation and an operation quantity for the winch operation unit, and the predetermined condition can include a condition in which, where the over-hoisting detection means detects that the distance of the hook from the distal end of the boom becomes equal to or less than the predetermined length, the operational orientation of the boom telescopic operation unit is an extended orientation of the boom, the operational orientation of the boom derricking operation unit is a lowered orientation of the boom, or the operational orientation of the winch operation unit is a lifted orientation of the hook.

With this configuration, in a state where a distance of the hook from the distal end of the boom becomes equal to or less than a predetermined length, that is, in an over-hoisting state, image data recording with the digital camera starts when the operational orientation of the boom telescopic operation unit being an extended orientation of the boom, or the operational orientation of the boom derricking operation unit being a lowered orientation of the boom, or the operational orientation of the winch operation unit being a lifted orientation of the hook. In addition, an operational orientation and an operation quantity for each of the boom telescopic operation unit, the boom derricking operation unit, and the winch operation unit and an over-hoisting state are recorded concurrently with the image data recording. Thus, when an accident (such as hoisted load falling) occurs during operation, the image data is analyzed after the accident, and accordingly there are obtained a variation in such as the operational orientations and operation quantities for each operation lever before and after, and at the hoisted load falling.

(6) The controller may perform a process of range setting for storing in the storage unit, a permissible working range which is determined based on an extension quantity of the outrigger, a slewing angle of the slewing base, a derricking angle of the boom, the length of the boom, and the load applied to the hook and a stop process for stopping the slewing actuator, the telescopic actuator, and derrick actuator when a position of the boom reaches a range end of the permissible working range stored in the storage unit. When so configured, the predetermined measurement value represents the slewing angle of the slewing base, the derricking angle of the boom, and the length of the boom, and the predetermined condition can include a condition in which the slewing angle of the slewing base, the derricking angle of the boom, and the length of the boom each reaches a predetermined distance or angle short of the range end of the permissible working range.

With this configuration, image data recording with the digital camera starts when the slewing angle of the slewing base, the length of the boom, and the derricking angle of the boom each reaches a predetermined distance or angle short of a range end of a permissible working range (for example, reaching 5° short of a range end of a permissible slewing angle). In addition, the slewing angle of the slewing base, the length of the boom, and the derricking angle of the boom are recorded concurrently with the image data recording. Thus, when an accident (such as contact of the boom with an obstacle) occurs during operation, the image data is analyzed after the accident, and accordingly there are obtained the slewing angle of the slewing base, the length of the boom, and the derricking angle of the boom before and after, and at the contact of the boom with the obstacle.

(7) The controller may further include a driving speed calculation process for calculating the slewing speed of the slewing base, the telescopic speed of the boom, the derricking speed of the boom, and the motion speed of the hook. When so configured, the predetermined measurement value represents the slewing speed, the telescopic speed, the derricking speed, and the motion speed, and the predetermined condition can include a condition in which the slewing speed, the telescopic speed, the derricking speed, and the motion speed each reaches a predetermined speed.

With this configuration, image data recording with the digital camera starts when the slewing speed of the slewing base, the telescopic speed of the boom, the derricking speed of the boom, or the motion speed of the hook each reaches a predetermined speed. In addition, the slewing speed of the slewing base, the telescopic speed of the boom, the derricking speed of the boom, and the motion speed of the hook are recorded concurrently with the image data recording. Thus, when an accident (such as hoisted load falling) occurs during operation, the image data is analyzed after the accident, and accordingly there are obtained each variation in the slewing speeds of the slewing base, the telescopic speeds of the boom, the derricking speeds of the boom, and the motion speeds of the hook before and after, and at the hoisted load falling.

(8) The predetermined measurement value may further include the weight of hoisted load detected by the load detection means and a load factor which is defined as a percentage of the weight of hoisted load relative to suspendible maximum weight of the hoisted load.

(9) The digital camera may be installed as a dashboard camera.

With this configuration, there is no need to newly install a digital camera.

(10) The digital camera may be installed for capturing bird's-eye view image of the crane vehicle.

With this configuration, there is no need to newly install a digital camera.

According to the present invention, image data upon occurrence of an accident is recorded while reducing capacity storage and power consumption, and therefore it is possible to analyze a situation of an accident occurred in a crane vehicle during operation at low cost.

BRIEF DESCRIPTION OF DRAWINGS

FIG. 13 is a table for representing a correspondence between condition for starting recording with a digital camera and the activated digital camera.

DETAILED DESCRIPTION

Hereinafter, preferred embodiments of the present invention will be described with reference to figures, as appropriate. In this regard, the embodiments are merely aspects of the present invention, and it is needless to say that the embodiments may be modified in a range without departing from the gist of the present invention.

[Rough Terrain Crane 10]

Figure 1:
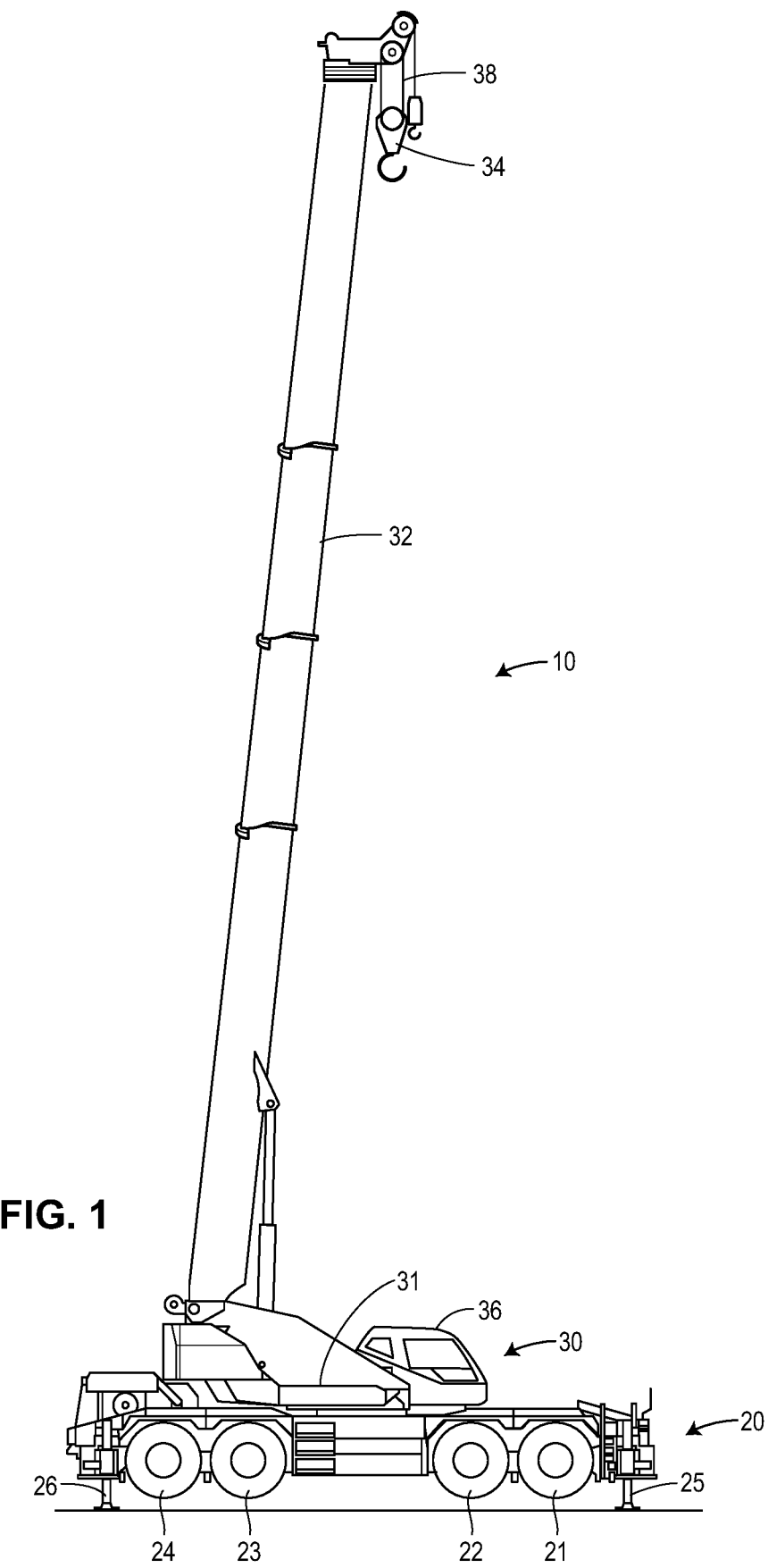
FIG. 1 is a schematic view illustrating a rough terrain crane 10 according to the embodiment.
Figure 2:
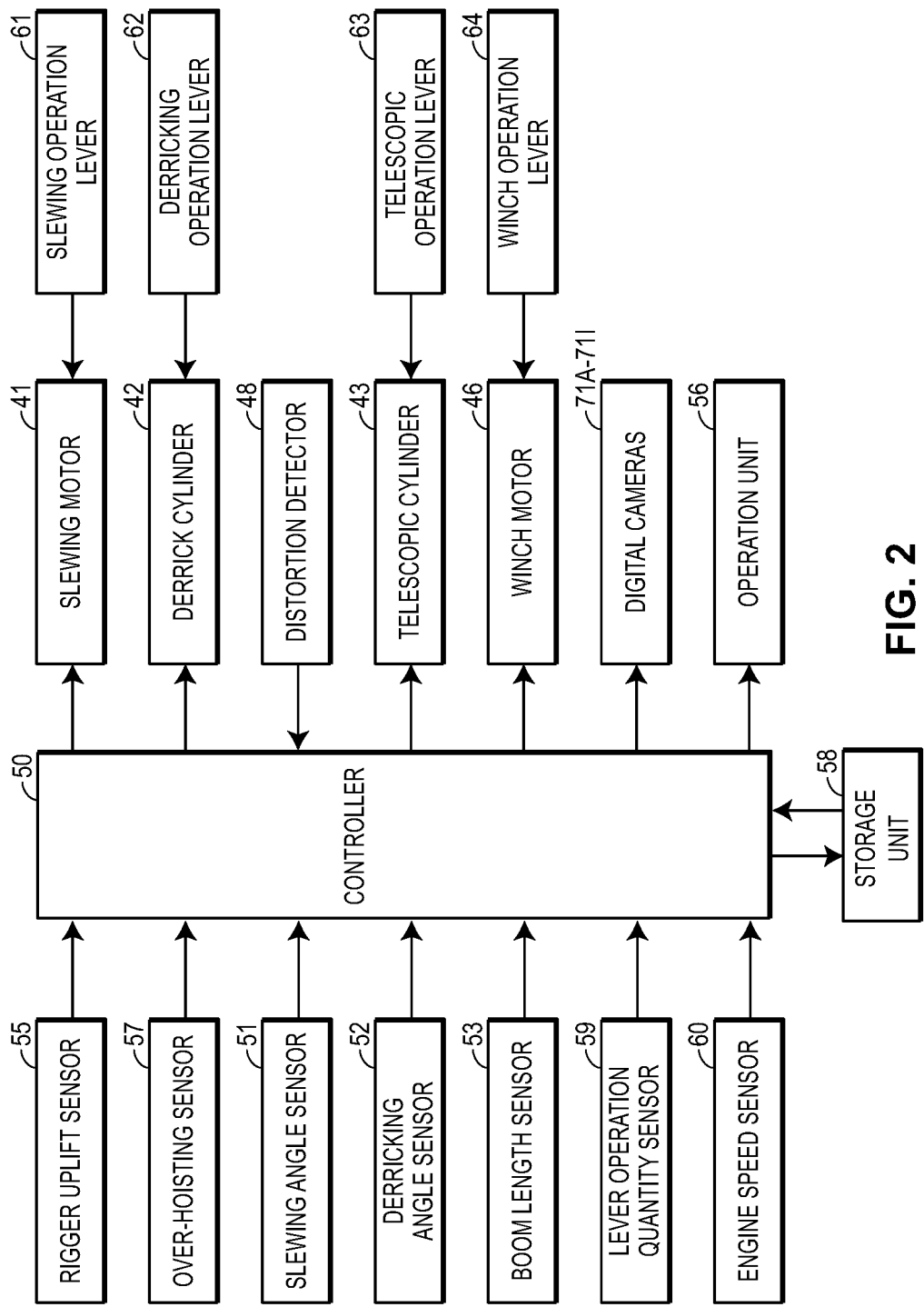
FIG. 2 is a functional block diagram of the rough terrain crane 10.

FIG. 1 is a schematic view illustrating a rough terrain crane 10 according to the embodiment. FIG. 2 is a functional block diagram of the rough terrain crane 10.

As illustrated in FIG. 1, the rough terrain crane 10 according to the embodiment includes a lower carrier 20 and an upper structure 30. The rough terrain crane 10 corresponds to the "crane vehicle" recited in the claims. However, a specific example of the crane vehicle is not limited to the rough terrain crane 10, and examples thereof may include an all-terrain crane, or the like.

[Lower Carrier 20]

The lower carrier 20 (which corresponds to the "carrier" recited in the claims) includes two lateral pairs of front wheels 21 and 22, and two lateral pairs of rear wheels 23 and 24 (illustrating only right side in FIG. 1). The front wheels 21 and 22, and the rear wheels 23 and 24 are rotated by a driving force of an engine (not illustrated) transmitted through a transmission (not illustrated). The lower carrier 20 travels by operating a steering, an accelerator pedal, a brake pedal, or the like disposed inside a cabin 36, which will be described below, by an operator.

The lower carrier 20 includes a pair of left and right outrigger 25 provided on a front side thereof and a pair of left and right outrigger 26 provided on a rear side of the lower carrier 20 (illustrating only right side in FIG. 1). The outriggers 25 and 26 are capable of performing a state change between a grounding state in which the outriggers are in contact with the ground at positions at which the outriggers are laterally extended out from the lower carrier 20 and an accommodating state in which the outriggers are accommodated in the lower carrier 20 in a state of leaving the ground. However, outriggers 25 and 26 may be in contact with the ground at positions at which the outriggers are not laterally extended out from the lower carrier 20. The outriggers 25 and 26 in the grounding state cause the rough terrain crane 10 to have a stable posture when the upper structure 30 is actuated. Meanwhile, the outriggers 25 and 26 are brought into the accommodating state when the lower carrier 20 is traveling.

[Upper Structure 30]

The upper structure 30 includes a slewing base 31, a boom 32, a hook 34, and a cabin 36. The slewing base 31 is slewably supported on the lower carrier 20 through a slewing bearing (not illustrated). The boom 32 is supported by the slewing base 31 in a derrickable and telescopic manner. The hook 34 is suspended from a rope 38 extending downward from a distal end portion of the boom 32. The cabin 36 is provided with an operation unit 56 (see FIG. 2) and various operation levers 61 to 64 for operating the upper structure 30 (see FIG. 2). The operation unit 56 includes various operation units and such as an operation panel for causing the lower carrier 20 to travel.

The slewing base 31 is slewed by a slewing motor 41 (see FIG. 2). The slewing motor 41 corresponds to the "slewing actuator" recited in the claims. The boom 32 is raised and lowered by a derrick cylinder 42 and extends and retracts with a telescopic cylinder 43 (see FIG. 2). The derrick cylinder 42 corresponds to the "derrick actuator" recited in the claims and the telescopic cylinder 43 corresponds to the "telescopic actuator" recited in the claims. The hook 34 is lifted and lowered by winding and unwinding of the rope 38 by a winch. The winch is rotated by a winch motor 46 (see FIG. 2). The winch motor 46 corresponds to the "winch actuator" recited in the claims. Hereinafter, the slewing motor 41, the derrick cylinder 42, the telescopic cylinder 43, and the winch motor 46 may be simply referred to as "actuator". The slewing motor 41, the derrick cylinder 42, the telescopic cylinder 43, the winch motor 46, and an actuator for actuating the outriggers 25 and 26 are hydraulic actuators, or the like. In other words, the rough terrain crane 10 actuates the actuators by controlling a direction and a flow rate of hydraulic oil to be supplied. However, the actuators of the present invention are not limited to the hydraulic actuators, and electric actuators or the like also may be used.

Each of the various operation levers 61 to 64 (see FIG. 2) corresponds to each actuator, and specifically includes, for example, a slewing operation lever 61 for slewing the slewing base 31, a telescopic operation lever 63 for extending and retracting the boom 32, a derricking operation lever 62 for raising and lowering the boom 32, and a winch operation lever 64 for winding and unwinding of the rope 38. The slewing operation lever 61 corresponds to the "slewing operation unit" recited in the claims, the telescopic operation lever 63 corresponds to the "boom telescopic operation unit" recited in the claims, the derricking operation lever 62 corresponds to the "boom derricking operation unit" recited in the claims, and the winch operation lever 64 corresponds to the "winch operation unit" recited in the claims. Hereinafter, these levers may be collectively referred to simply as an "operation lever".

[Digital Camera 71]

The rough terrain crane 10 is provided with a plurality of digital cameras 71A, 71B, 71C, 71D, 71E, 71F, 71G, 71H, and 71I (see FIG. 2) capable of capturing a video image. Hereinafter, the digital cameras 71A, 71B, 71C, 71D, 71E, 71F, 71G, 71H, and 71I may be collectively referred to as a digital camera 71. The digital camera 71 is arranged as described below.

The digital camera 71A is fixed to a front end portion of the lower carrier 20. The digital camera 71A captures the front from the front end portion of the lower carrier 20.

The digital camera 71B is fixed to a rear end portion of the lower carrier 20. The digital camera 71B captures the rear from the rear end portion of the lower carrier 20.

The digital camera 71C is provided at a front left end portion of the lower carrier 20. The digital camera 71C captures the rear from the front left end portion of the lower carrier 20 (left side of the rough terrain crane 10). Specifically, the digital camera 71C is fixed to a rearview mirror (side mirror) provided such that the left side of the rough terrain crane 10 is captured when viewed from the cabin 36.

The digital camera 71D is fixed to a left end portion of the cabin 36. The digital camera 71D captures the left from the left end portion of the cabin 36.

The digital camera 71E is fixed to a right end portion of the cabin 36. The digital camera 71E captures the right from the right end portion of the cabin 36.

The digital camera 71F is fixed to an upper end portion of a drum. The digital camera 71F captures the drum from the upper end portion of the drum.

The digital camera 71G is fixed to a left side of the distal end portion of the boom 32. The digital camera 71G captures the left from the left side of the distal end portion of the boom 32. A capturing orientation of the digital camera 71G is automatically changed to a downward direction when a derricking angle of the boom 32 during operation so that a lower part can be captured during operation.

The digital camera 71H is fixed to a right side of the distal end portion of the boom 32. The digital camera 71H captures the right from the right side of the distal end portion of the boom 32. A capturing orientation of the digital camera 71H is automatically changed to a downward direction when a derricking angle of the boom 32 during operation so that a lower part can be captured during operation.

The digital camera 71I which is a digital camera for a dashboard camera, is fixed inside the cabin 36. The digital camera 71I captures the front from the inside of the cabin 36.

[Controller 50]

As illustrated in FIG. 2, the rough terrain crane 10 includes a controller 50. The controller 50 controls operations of the rough terrain crane 10. The controller 50 may be implemented by a central processing unit (CPU) that executes a program stored in a storage unit 58, may be implemented by a hardware circuit, or may be implemented by combinations thereof.

The controller 50 obtains various types of signals that are outputted from a distortion detector 48, a rigger uplift sensor 55, an over-hoisting sensor 57, a slewing angle sensor 51, a derricking angle sensor 52, a boom length sensor 53, a lever operation quantity sensor 59, an engine speed sensor 60, and the operation unit 56. In addition, the controller 50 controls the slewing motor 41, the derrick cylinder 42, the telescopic cylinder 43, and the winch motor 46, based on the various types of obtained signals.

Moreover, the controller 50 receives the image data outputted from the digital camera 71 to store in the storage unit 58.

The operation unit 56 receives operations for actuating the rough terrain crane 10. The operation unit 56 outputs an operation signal corresponding to the received operation. In other words, the controller 50 allows the lower carrier 20 to travel and operates the upper structure 30, based on the operation received through the operation unit 56.

[Distortion Detector 48]

The distortion detector 48 is attached to the derrick cylinder 42. The distortion detector 48 detects a load quantity applied to the boom 32 (see FIG. 1). The distortion detector 48 corresponds to the "load detection means" recited in the claims. The distortion detector 48 outputs a detection signal corresponding to the load quantity applied to the boom 32 (more specifically, a weight of hoisted load suspended by the hook 34).

[Rigger Uplift Sensor 55]

The rigger uplift sensor 55 is a sensor for detecting that any of ground contact points of the outriggers 25 and 26 (see FIG. 1) leaves the ground (being lifted off the ground) when the outriggers 25 and 26 are present in the grounding state. The rigger uplift sensor 55 corresponds to the "uplift detection means" recited in the claims. The rigger uplift sensor 55 outputs a detection signal corresponding to whether any of the outriggers 25 and 26 being uplifted is present.

[Over-hoisting Sensor 57]

The over-hoisting sensor 57 is a sensor for detecting that a distance from the distal end of the boom 32 (see FIG. 1) to the hook 34 (see FIG. 1) becomes equal to or less than "over-hoisting length". The over-hoisting sensor 57 corresponds to the "over-hoisting detection means" recited in the claims. The "over-hoisting length" is a concept indicating a state where the distance from the distal end of the boom becomes equal to or less than a predetermined length, and the distance from the distal end of the boom in a state where a dangerous situation occurs due to the hook 34 excessively approaching the distal end of the boom 32, referred to as the "over-hoisting length". The over-hoisting sensor 57 outputs a detection signal corresponding to whether the distance from the distal end of the boom is equal to or less than the over-hoisting length.

[Lever Operation Quantity Sensor 59]

The lever operation quantity sensor 59 is a sensor for detecting an operational orientation and an operation quantity for any operation levers. The lever operation quantity sensor 59 outputs a detection signal corresponding to a lever type, the operational orientation, and the operation quantity.

[Slewing Angle Sensor 51]

The slewing angle sensor 51 is a sensor for detecting a slewing angle (for example, an angle in a clockwise direction with a forward direction of the lower carrier 20 as 0°) of the slewing base 31 (see FIG. 1). The slewing angle sensor 51 outputs a detection signal corresponding to the slewing angle of the slewing base 31.

[Derricking Angle Sensor 52]

The derricking angle sensor 52 is a sensor for detecting a derricking angle (an angle between a horizontal direction and the boom 32) of the boom 32 (see FIG. 1). The derricking angle sensor 52 outputs a detection signal corresponding to the derricking angle of the boom 32.

[Boom Length Sensor 53]

The boom length sensor 53 is a sensor for detecting a length of the boom 32 (see FIG. 1). The boom length sensor 53 outputs a detection signal corresponding to the length of the boom 32.

[Engine Speed Sensor 60]

The engine speed sensor 60 is a sensor for detecting a rotation speed of an engine (not illustrated) mounted on the lower carrier 20. The engine speed sensor 60 outputs a detection signal corresponding to the rotation speed of the engine. The engine speed sensor 60 corresponds to the "speed obtaining unit" recited in the claims.

[Image Data Recording Process]

Figure 3:
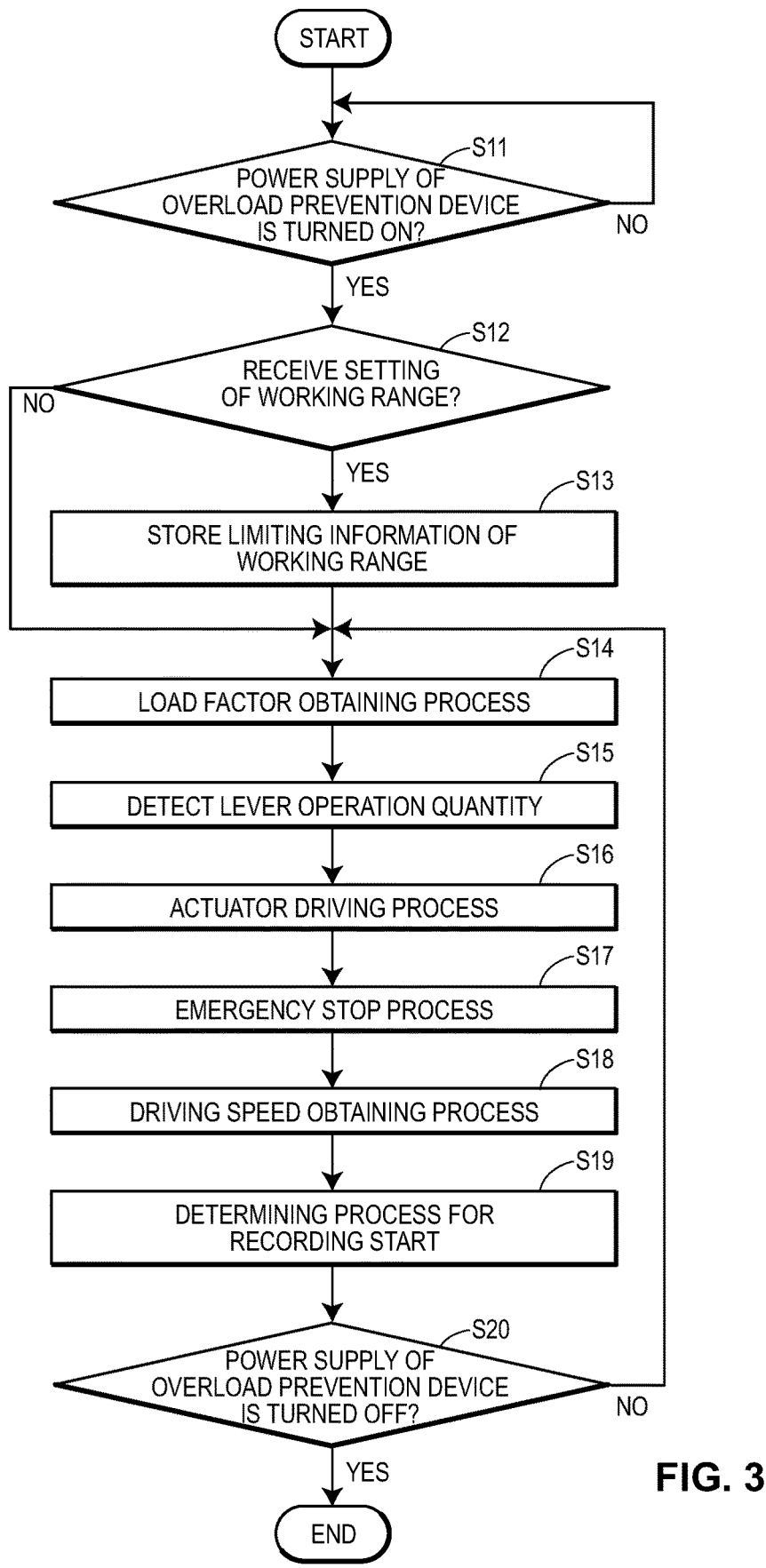
FIG. 3 is a flowchart illustrating movement of a main flow.

As illustrated in FIGS. 3 to 12, an image data recording process is performed in the rough terrain crane 10. The controller 50 repeatedly performs the image data recording process as illustrated in FIG. 3.

In the image data recording process, firstly, upon a power supply of the rough terrain crane 10 being turned on (so-called PTO is turned on), a power supply of an overload prevention device is turned on. The controller 50 determines whether the power supply of the overload prevention device is turned on (S11) until it is turned on (S11: No).

The controller 50 determines whether the operation unit 56 receives a setting of a permissible working range (S12).

The permissible working range is determined based on an extension quantity of the outriggers 25 and 26, a slewing range of the slewing base 31, a maximum extended length of the boom 32, a derricking range of the boom 32, and a maximum weight of a hoisted load. The slewing base 31 and the boom 32 is allowed to move in the permissible working range determined based on these setting parameters. The determined permissible working range is defined by a working radius, a lifting height, the slewing range of the slewing base 31, a telescopic range of the boom 32, and the derricking range of the boom 32. When the slewing base 31 and the boom 32 reach a boundary of this working range, for example, the slewing motor 41, the derrick cylinder 42, and the telescopic cylinder 43 are suspended, causing movement of the slewing base 31 and the boom 32 to be stopped. The setting of the permissible working range is configured by an operator inputting the setting parameter to the operation unit 56.

When the setting of the working range is received (S12: Yes), the controller 50: receives from the operation unit 56, the signals associated with the extension quantity of the outriggers 25 and 26, the slewing range of the slewing base 31, the maximum extended length of the boom 32, the derricking range of the boom 32, and the maximum weight of the hoisted load; and calculates, as the parameters for defining the permissible working range, the working radius, the lifting height, the slewing range of the slewing base 31, the telescopic range of the boom 32, and the derricking range of the boom 32. These parameters for defining the permissible working range are stored in the storage unit 58 (S13).

When no setting of the permissible working range is received (S12: No), the controller 50 skips the process of step S13 to perform a process of a load factor obtaining process (S14).

Figure 4:
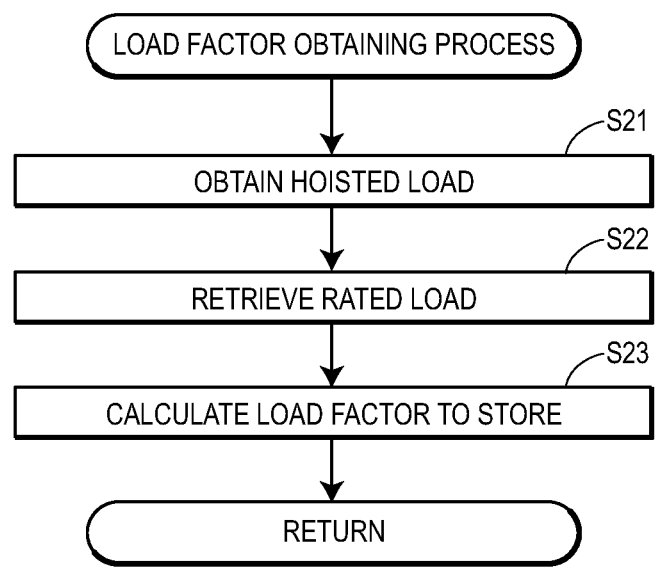
FIG. 4 is a flowchart illustrating a flow of a load factor obtaining process.

Details of the load factor obtaining process are illustrated in FIG. 4. It is preferred that a load factor is continuously obtained in actual controlling.

The controller 50 receives from the lever operation quantity sensor 59, an output signal derived from an operator manipulating an operation lever (S15). Here, the lever operation quantity detected by the lever operation quantity sensor 59 is a lever operation quantity in micro time, and the processes of steps S14 to S20 are constantly repeated.

Figure 5:
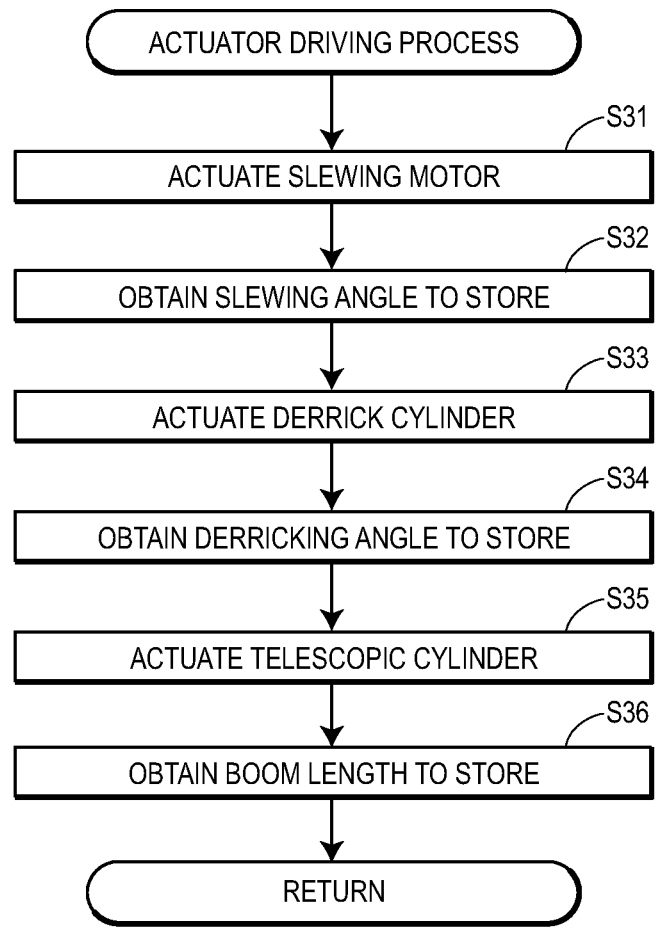
FIG. 5 is a flowchart illustrating a flow of an actuator driving process.
Figure 11:
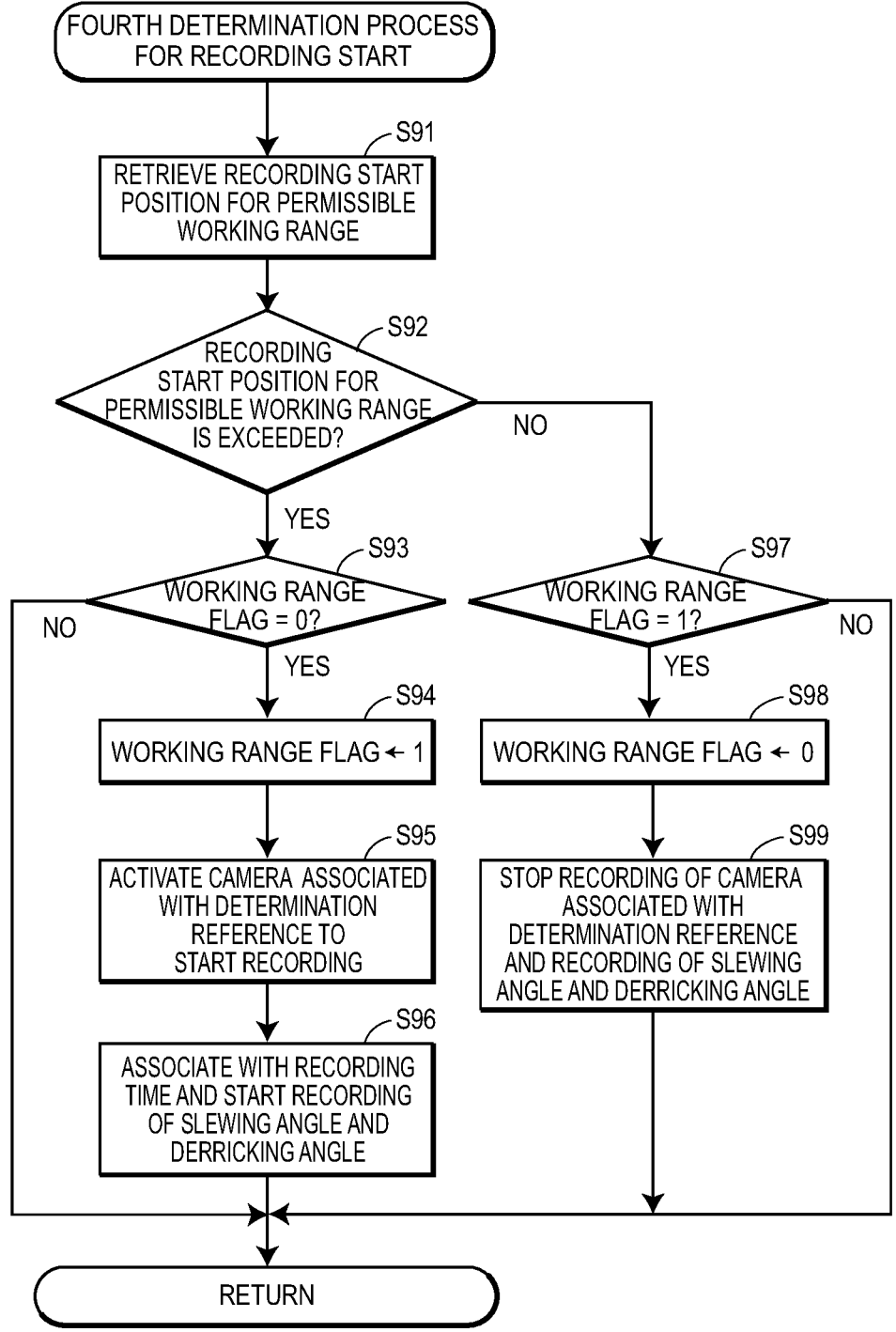
FIG. 11 is a flowchart illustrating a flow of a fourth determination process for recording start.

The controller 50 performs an actuator driving process (S16). The actuator driving process is a process for actuating an actuator corresponding to the manipulated operation lever to obtain the slewing angle of the slewing base 31, the length of the boom 32, and the derricking angle of the boom 32 that are changed. Details of the actuator driving process are illustrated in FIG. 5. The angle and length obtained in the actuator driving process is used in a fourth determination process for recording start as illustrated in FIG. 11.

The controller 50 performs an emergency stop process (S17). In the emergency stop process, the controller 50 stops the present work operation by transmitting a stop signal to an actuator having reached the range end when the slewing angle of the slewing base 31, the derricking angle of the boom 32, or the length of the boom 32 each reaching a range end of the permissible working range.

Figure 6:
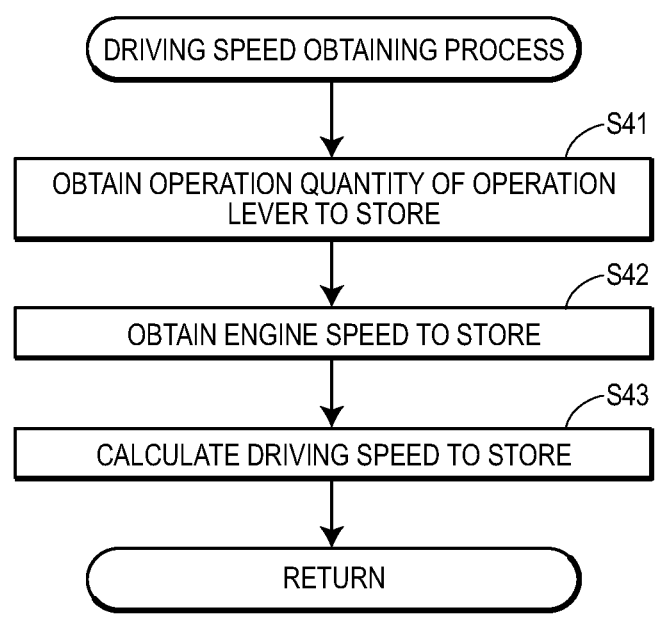
FIG. 6 is a flowchart illustrating a flow of a driving speed obtaining process.
Figure 12:
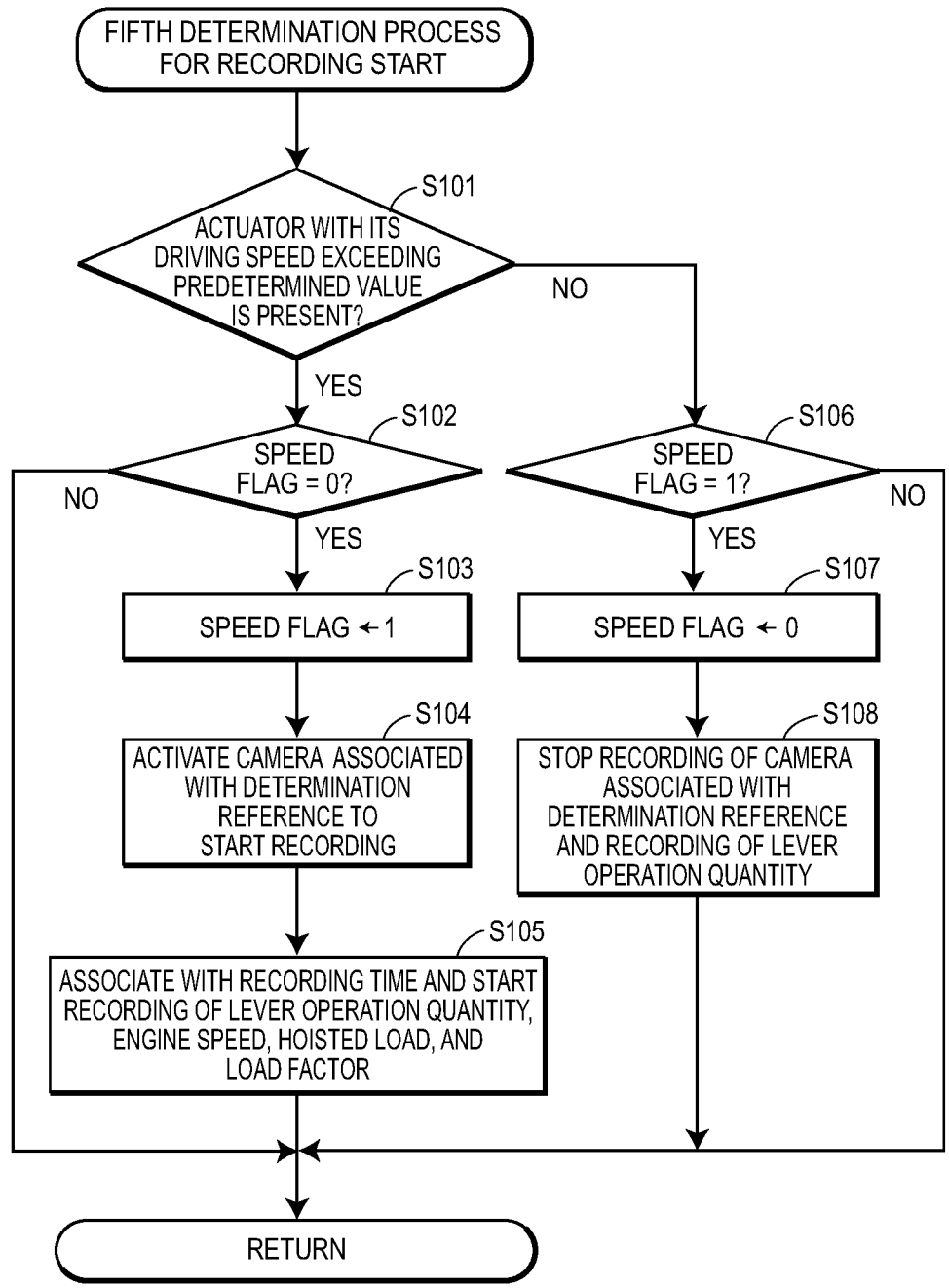
FIG. 12 is a flowchart illustrating a flow of a fifth determination process for recording start.

The controller 50 performs a driving speed obtaining process (S18). The driving speed obtaining process is a process for obtaining a driving speed of the slewing base 31, the boom 32, or the hook 34. Details of the driving speed obtaining process are illustrated in FIG. 6. The driving speed obtained in the driving speed obtaining process is used in a fifth determination process for recording start as illustrated in FIG. 12.

Figure 7:
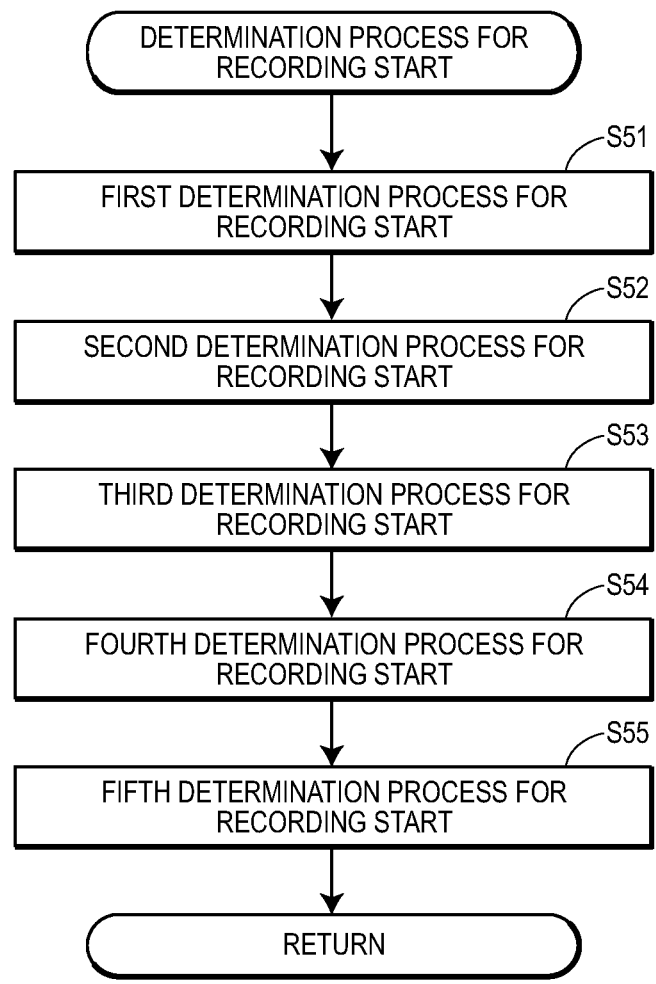
FIG. 7 is a flowchart illustrating a flow of a determination process for recording start.

The controller 50 performs a determination process for recording start (S19). The determination process for recording start is a process for starting and stopping the image data recording with the digital camera 71. Details of the determination process for recording start are illustrated in FIG. 7.

The controller 50 determines whether the power supply of the overload prevention device is turned off (S20).

When the power supply of the overload prevention device is not turned off (S20: No), the controller 50 returns to step S14 to repeat the process started from step S14.

When the power supply of the overload prevention device is turned off (S20: Yes), the controller 50 terminates the image data recording process.

[Load Factor Obtaining Process]

FIG. 4 is a flowchart illustrating a flow of the load factor obtaining process which is performed in step S14 of the image data recording process as illustrated in FIG. 3.

In load factor obtaining process, the controller 50 obtains a load weight of hoisted load the hook 34 (S21). The hoisted load is obtained, for example, by receiving a detection signal corresponding to the load quantity applied to the boom 32 from the distortion detector 48 attached to the derrick cylinder 42.

The controller 50 retrieves a rated load (suspendible maximum weight of the hoisted load) stored in the storage unit 58 (S22).

The controller 50 represents in percentages the value yielded by dividing the hoisted load obtained in step S21 by the rated load obtained in step S22 to calculate a load factor, stores in the storage unit 58 (S23), and terminates the load factor obtaining process.

[Actuator Driving Process]

FIG. 5 is a flowchart illustrating a flow of the actuator driving process which is performed in S16 of the image data recording process as illustrated in FIG. 3.

In the actuator driving process, the controller 50 transmits to the slewing motor 41, a drive signal indicating a driving orientation and a driving speed for a slewing action of the slewing base 31, based on the output signal received from the lever operation quantity sensor 59 in step S15 of FIG. 3, and actuates the slewing motor 41 (S31). This allows the slewing base 31 to be slewed. For the output signal from the lever operation quantity sensor 59, no slewing action is performed if an operation quantity for the slewing operation is equal to 0.

The controller 50 receives the output signal from the slewing angle sensor 51 to obtain a new slewing angle of the slewing base 31, and stores in the storage unit 58 (S32).

The controller 50 transmits to the derrick cylinder 42, a drive signal indicating a driving orientation and a driving speed for a derricking action of the boom 32, based on the output signal from the lever operation quantity sensor 59, and actuates the derrick cylinder 42 (S33). This allows the boom 32 to be derricked. For the output signal from the lever operation quantity sensor 59, no derricking action of the boom 32 is performed if an operation quantity for the derricking operation of the boom 32 is equal to 0.

The controller 50 receives the output signal from the derricking angle sensor 52 to obtain a new derricking angle of the boom 32, and stores in the storage unit 58 (S34).

The controller 50 transmits to the telescopic cylinder 43, a drive signal indicating a driving orientation and a driving speed for a telescopic action of the boom 32, based on the output signal from the lever operation quantity sensor 59, and actuates the telescopic cylinder 43 (S35). This allows the boom 32 to extend and retract. For the output signal from the lever operation quantity sensor 59, no telescopic action of the boom 32 is performed if an operation quantity for the telescopic operation of the boom 32 is equal to 0.

The controller 50 receives the output signal from the boom length sensor 53 to obtain a new length of the boom 32, and stores in the storage unit 58 (S36).

[Driving Speed Obtaining Process]

FIG. 6 is a flowchart illustrating a flow of the driving speed obtaining process which is performed in step S18 of the image data recording process as illustrated in FIG. 3.

In the driving speed obtaining process, the controller 50 obtains an operational orientation and an operation quantity for each operation lever and stores them in the storage unit 58, based on the output signal received from the lever operation quantity sensor 59 in step S15 of FIG. 3 (S41).

The controller 50 obtains a rotation speed of the engine from a signal received from the engine speed sensor 60 and stores in the storage unit 58 (S42).

The controller 50 calculates the driving orientation and the driving speed for each operation, based on the operational orientation and the operation quantity for the operation corresponding to each operation lever, and the engine speed, stores in the storage unit 58 (S43), and terminates the driving speed obtaining process.

[Determination Process for Recording Start]

FIG. 7 is a flowchart illustrating a flow of the determination process for recording start which is performed in step S19 of the image data recording process as illustrated in FIG. 3.

Figure 8:
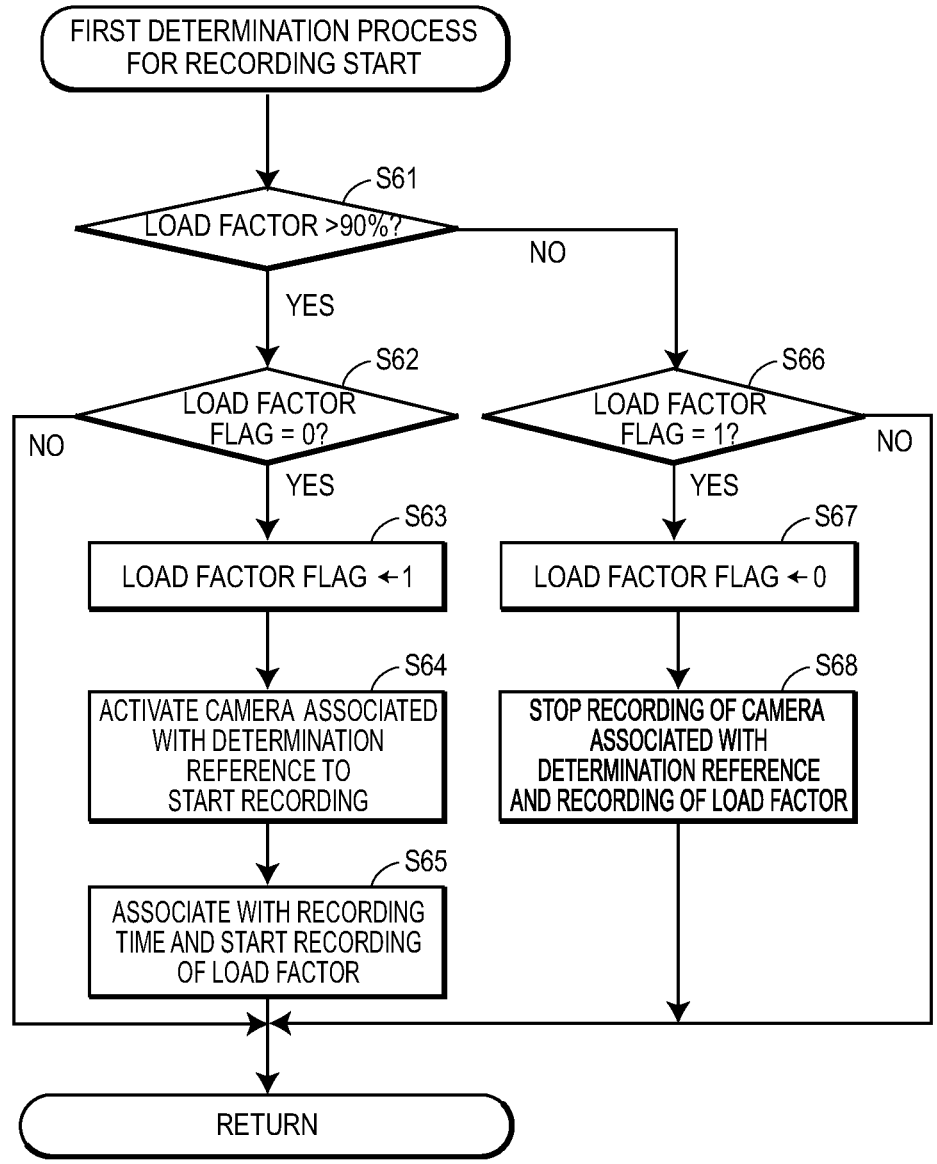
FIG. 8 is a flowchart illustrating a flow of a first determination process for recording start.

In a recording start process, the controller 50 performs a first determination process for recording start (S51). Details of the first determination process for recording start are illustrated in FIG. 8.

Figure 9:
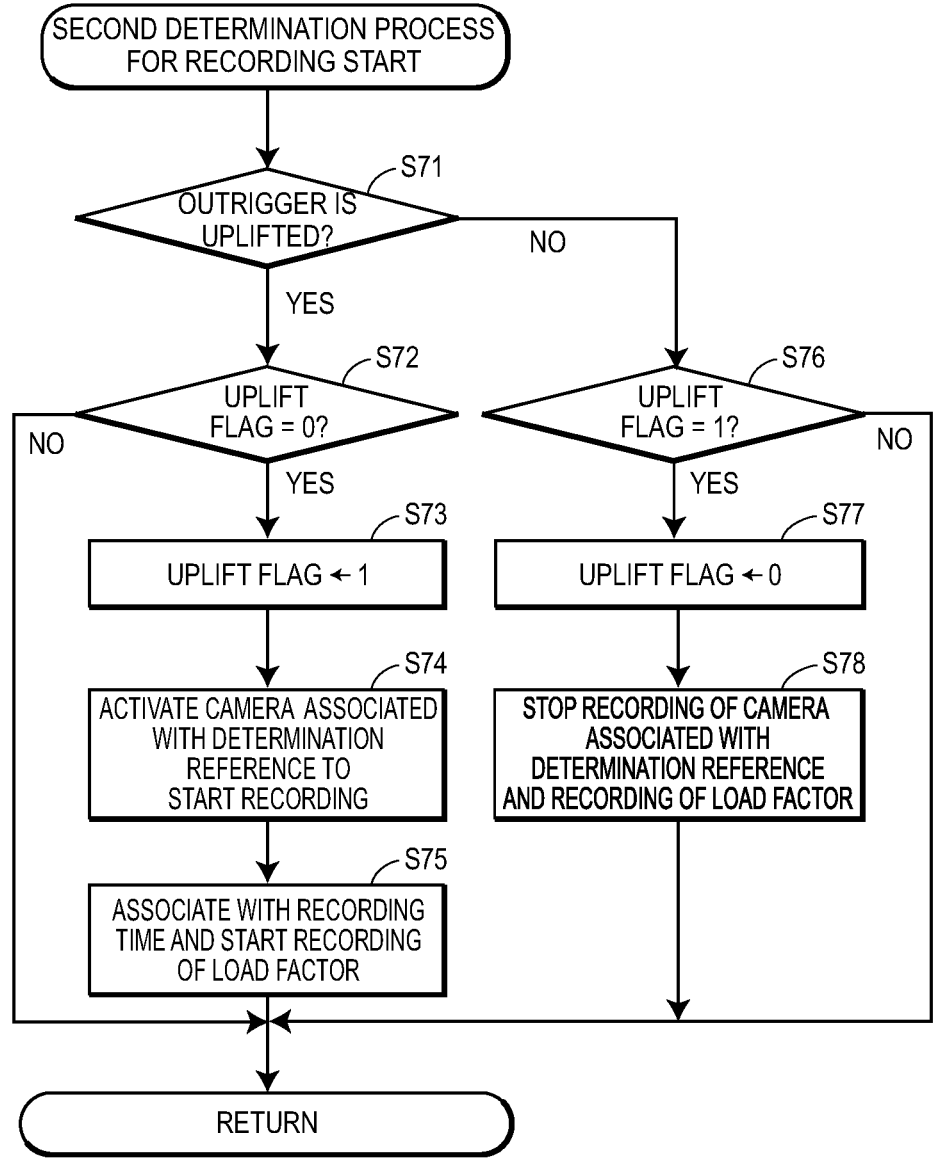
FIG. 9 is a flowchart illustrating a flow of a second determination process for recording start.

The controller 50 performs a second determination process for recording start (S52). Details of the second determination process for recording start are illustrated in FIG. 9.

Figure 10:
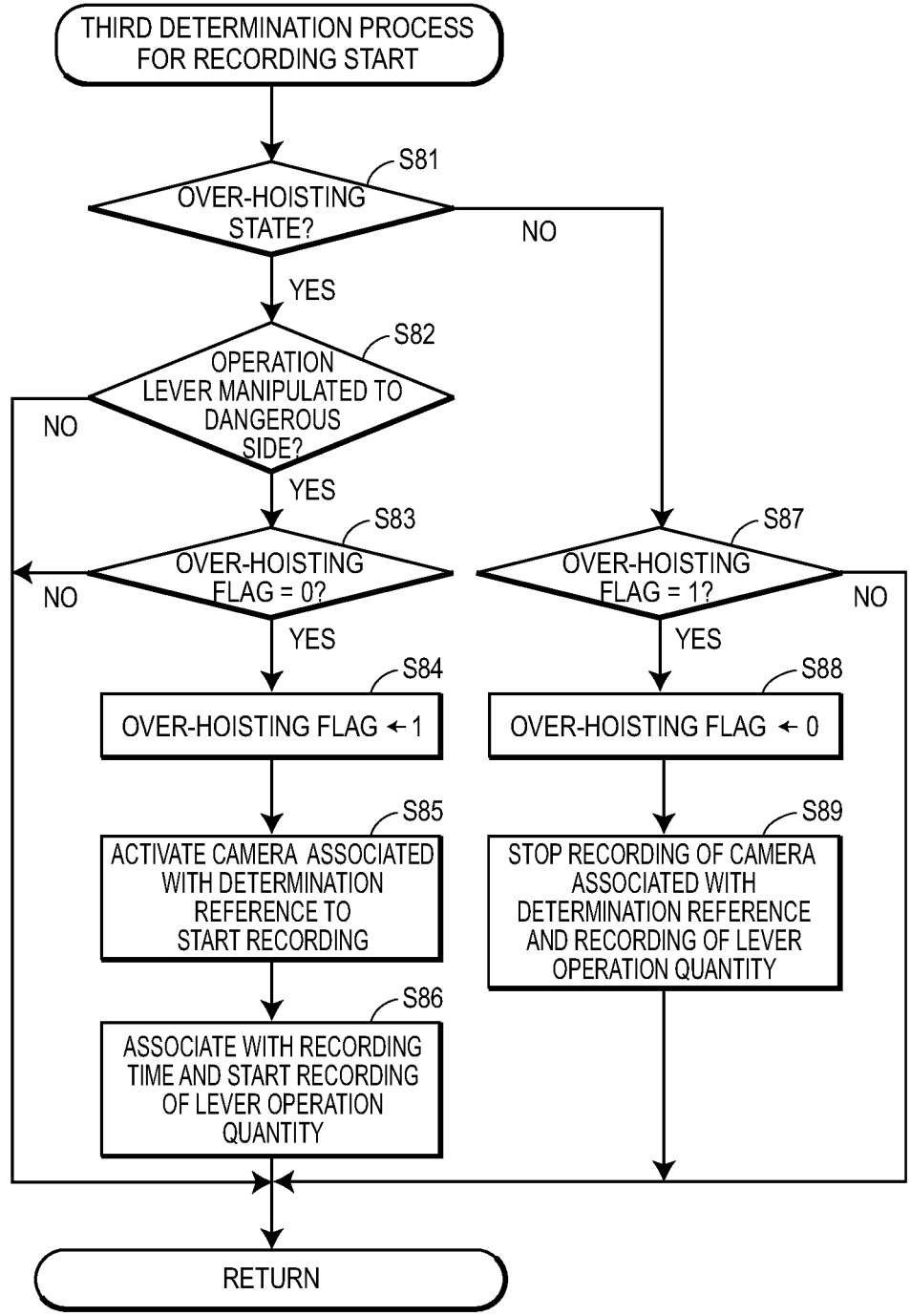
FIG. 10 is a flowchart illustrating a flow of a third determination process for recording start.

The controller 50 performs a third determination process for recording start (S53). Details of the third determination process for recording start are illustrated in FIG. 10.

The controller 50 performs the fourth determination process for recording start (S54). Details of the fourth determination process for recording start are illustrated in FIG. 11.

The controller 50 performs the fifth determination process for recording start (S55) and terminates the determination process for recording start. Details of the fifth determination process for recording start are illustrated in FIG. 12.

[First Determination Process for Recording Start]

FIG. 8 is a flowchart illustrating a flow of the first determination process for recording start which is performed in step S51 of the determination process for recording start as illustrated in FIG. 7.

In the first determination process for recording start, the controller 50 retrieves a load factor from the storage unit 58 and determines whether the load factor is greater than the predetermined threshold, such as 90% (S61). Hereinafter, condition of the load factor being greater than 90% is referred to as "first condition". FIG. 13 represents a correspondence between a first condition and the digital camera 71 (digital cameras 71A to 71I) activated when the first condition is met.

When it is determined that a load factor is greater than the predetermined threshold (S61: Yes), the controller 50 determines whether the load factor flag stored in the storage unit 58 is set to 0 (S62). The value 0 is substituted for the load factor flag when the first determination process for recording start is performed firstly after the load factor exceeding the predetermined threshold, and thereafter the value 1 is substituted. The value 1 is substituted for the load factor flag when the first determination process for recording start is performed firstly after the load factor being equal to or less than the predetermined threshold, and thereafter the value 0 is substituted.

When the load factor flag is set to 0 (S62: Yes), the controller 50 substitutes the value 1 for the load factor flag stored in the storage unit 58 (S63).

The controller 50 transmits an activation signal and a start recording signal to the digital camera 71 (such as digital cameras 71A to 71I) which is associated with the first condition to be stored in the storage unit 58, and cause the relevant digital camera 71 to activate as well as to start storing movie image data captured with the relevant digital camera 71 in the storage unit 58 (S64). However, there is no need to activate the digital camera 71 remained continuously activated and the digital camera 71 having been activated by other conditions being met. There is no need to start recording image data with the digital camera 71 that has started recording image data by other conditions being met.

The controller 50 synchronizes with a record of image data, more specifically, associates with a time lapse of the image data (which corresponds to the term "concurrently" recited in the claims), starts storing a load factor in the storage unit 58 (S65), and returns the first determination process for recording start.

In the process of step S62, when the load factor flag is not equal to 0 (S62: No), the controller 50 skips the processes of steps S63 to S65 to return the first determination process for recording start.

In the process of step S61, when it is determined that a load factor is not greater than the predetermined threshold (S61: No), the controller 50 determines whether the load factor flag stored in the storage unit 58 is set to 1 (S66).

When the load factor flag is set to 1 (S66: Yes), the controller 50 substitutes the value 0 for the load factor flag stored in the storage unit 58 (S67).

The controller 50 transmits an end signal and a stop recording signal to the digital camera 71 which is associated with the first condition to be stored in the storage unit 58 to cause the image data recording to be stopped, deactivates the digital camera 71 as well as stops recording the load factor (S68), and returns the first determination process for recording start. However, there is no need to deactivate the digital camera 71 remained continuously activated. In addition, there is no need to stop recording image data with the digital camera 71 along with other conditions being met.

In the process of step S66, when the load factor flag is not equal to 1 (S66: No), the controller 50 skips steps S67 and S68 to return the first determination process for recording start.

[Second Determination Process for Recording Start]

FIG. 9 is a flowchart illustrating a flow of the second determination process for recording start which is performed in step S52 of the determination process for recording start as illustrated in FIG. 7.

In the second determination process for recording start, the controller 50 determines whether any of the outriggers 25 and 26 is uplifted (which leaves the ground) based on the signal received from the rigger uplift sensor 55 (S71). Hereinafter, condition in which any of the outriggers 25 and 26 is uplifted, is referred to as "second condition". FIG. 13 represents a correspondence between a second condition and the digital camera 71 (digital cameras 71A to 71I) activated when the second condition is met.

When it is determined that any of the outriggers 25 and 26 is uplifted (S71: Yes), the controller 50 determines whether an uplift flag stored in the storage unit 58 is set to 0 (S72). The value 0 is substituted for the uplift flag when the second determination process for recording start is performed firstly after the outrigger being uplifted, and thereafter the value 1 is substituted. The value 1 is substituted for the uplift flag when the second determination process for recording starting is performed firstly after the uplift of any of the outriggers 25 and 26 being eliminated, and thereafter the value 0 is substituted.

When the uplift flag is set to 0 (S72: Yes), the controller 50 substitutes the value 1 for the uplift flag stored in the storage unit 58 (S73).

The controller 50 transmits an activation signal and a start recording signal to the digital camera 71 (digital cameras 71A to 71I) which is associated with the second condition to be stored in the storage unit 58, and cause the relevant digital camera 71 to activate as well as to start storing movie image data captured with the relevant digital camera 71 in the storage unit 58 (S74). However, there is no need to activate the digital camera 71 remained continuously activated and the digital camera 71 having been activated by other conditions being met. There is no need to start recording image data with the digital camera 71 that has started recording image data by other conditions being met.

The controller 50 synchronizes with a record of image data, starts storing a load factor in the storage unit 58 (S75), and returns the second determination process for recording start.

In the process of step S72, when the uplift flag is not equal to 0 (S72: No), the controller 50 skips the processes of steps S73 to S75 to return the second determination process for recording start.

In the process of step S71, when it is determined that any of the outriggers 25 and 26 is not uplifted (S71: No), the controller 50 determines whether the uplift flag stored in the storage unit 58 is set to 1 (S76).

When the uplift flag is set to 1 (S76: Yes), the controller 50 substitutes the value 0 for the uplift flag stored in the storage unit 58 (S77).

The controller 50 transmits an end signal and a stop recording signal to the digital camera 71 which is associated with the second condition to be stored in the storage unit 58 to cause the image data recording to be stopped, deactivates the digital camera 71 as well as stops recording the load factor (S78), and returns the second determination process for recording start. However, there is no need to deactivate the digital camera 71 remained continuously activated. In addition, there is no need to stop recording image data with the digital camera 71 along with other conditions being met.

In the process of step S76, when the uplift flag is not equal to 1 (S76: No), the controller 50 skips steps S77 and S78 to return the second determination process for recording start.

[Third Determination Process for Recording Start]

FIG. 10 is a flowchart illustrating a flow of the third determination process for recording start which is performed in step S53 of the determination process for recording start as illustrated in FIG. 7.

In the third determination process for recording start, the controller 50 determines whether an over-hoisting state is present, based on the signal received from the over-hoisting sensor 57 (S81). The over-hoisting state refers to a state in which the hook 34 lifts up until the hook 34 reaches a predetermined position. The hook 34 lifts up, in the cases of the rope 38 being wound up, the boom 32 extending, and the boom 32 being lowered.

When it is determined that the over-hoisting state is present (S81: Yes), the controller 50 determines whether the operation lever is manipulated to the dangerous side (S82). The operation manipulated to the dangerous side refers to an operation performed to the side where the hook 34 further lifts up, and more specifically includes manipulating the winch operation lever 64 to a hosting side of the winch, manipulating the telescopic operation lever 63 to an extending side of the boom 32, and manipulating the derricking operation lever 62 to a lowered side of the boom 32. Hereinafter, condition in which the operation of the side of the hook 34 further lifting up is performed in the over-hoisting state, is referred to as "third condition". FIG. 13 represents a correspondence between a third condition and the digital camera 71 (digital cameras 71G, 71H, and 71I) activated when the third condition is met.

When it is determined that the operation lever is manipulated to the dangerous side (S82: Yes), the controller 50 determines whether an over-hoisting flag stored in the storage unit 58 is set to 0 (S83). The value 0 is substituted for the over-hoisting flag when the third determination process for recording start is performed firstly after the operation lever being manipulated to the dangerous side in the over-hoisting state, and thereafter the value 1 is substituted. The value 1 is substituted for the over-hoisting flag when the third determination process for recording start is performed firstly after the over-hoisting state being eliminated, and thereafter the value 0 is substituted.

When the over-hoisting flag is set to 0 (S83: Yes), the controller 50 substitutes the value 1 for the over-hoisting flag stored in the storage unit 58 (S84).

The controller 50 transmits an activation signal and a start recording signal to the digital camera 71 (digital cameras 71G, 71H, and 71I) which is associated with the third condition to be stored in the storage unit 58, and cause the relevant digital camera 71 to activate as well as to start storing movie image data captured with the relevant digital camera 71 in the storage unit 58 (S85). However, there is no need to start recording image data with the digital camera 71 remained continuously activated and the digital camera 71 which has been activated and started recording the image data by other conditions being met.

The controller 50 synchronizes with a record of image data, starts recording in the storage unit 58, an operation quantity of the operation lever manipulated to the dangerous side (S86), and returns the third determination process for recording start.

In the process of step S83, when the over-hoisting flag is not equal to 0 (S83: No), the controller 50 skips the processes of steps S84 to S86 to return the third determination process for recording start.

In the process of step S82, when the operation lever is not manipulated to the dangerous side (S82: No), the controller 50 skips the processes of steps S83 to S86 to return the third determination process for recording start.

In the process of step S81, when it is determined that no over-hoisting state is present (S81: No), the controller 50 determines whether the over-hoisting flag stored in the storage unit 58 is set to 1 (S87).

When the over-hoisting flag is set to 1 (S87: Yes), the controller 50 substitutes the value 0 for the over-hoisting flag stored in the storage unit 58 (S88).

The controller 50 transmits an end signal and a stop recording signal to the digital camera 71 which is associated with the third condition to be stored in the storage unit 58 to cause the image data recording to be stopped, deactivates the digital camera 71 as well as stops recording the operation quantity of the operation lever manipulated to the dangerous side (S89), and returns the third determination process for recording start. However, there is no need to deactivate the digital camera 71 remained continuously activated. In addition, there is no need to stop recording image data with the digital camera 71 along with other conditions being met.

In the process of step S87, when the over-hoisting flag is not equal to 1 (S87: No), the controller 50 skips steps S88 and S89 to return the third determination process for recording start.

[Fourth Determination Process for Recording Start]

FIG. 11 is a flowchart illustrating a flow of the fourth determination process for recording start which is performed in step S54 of the determination process for recording start as illustrated in FIG. 7.

In the fourth determination process for recording start, the controller 50 retrieves from the storage unit 58, a recording start position with respect to each parameter for defining the permissible working range (S91).

The recording start position is, for example, previously inputted to the operation unit 56 by an operator to be stored in the storage unit 58. The recording start position represents a predetermined distance or angle short of a range end of each parameter for defining the permissible working range, and more specifically includes the distance or angle of such as, 1 m short of the maximum working radius of a working radius, 1 m short of the maximum lifting height of a lifting height, 5° short of the respective slewing angle ends of each clockwise and counterclockwise in the slewing range of the slewing base 31, 1 m short of the telescopic range ends of each maximum extended length and maximum retracted length in the telescopic range of the boom 32, and 5° short of the respective derricking range ends of each maximum raising angle and maximum lowered angle in the derricking angle of the boom 32. The movement quantity of the distal end of the boom 32 for the boom 32 derricking differs depending on the length of the boom 32, and this may cause any other angle depending on the length of the boom 32 to be set with respect to the recording start position associated with the derricking angle.

The controller 50 determines whether any of a working radius, a lifting height, the slewing angle of the slewing base 31, the length of the boom 32, and the derricking angle of the boom 32 reaches a recording start position (S92). For the slewing angle of the slewing base 31, the length of the boom 32, and the derricking angle of the boom 32, a value is retrieved, which is stored in the storage unit 58 by the actuator driving process. The working radius and the lifting height are calculated based on the length of the boom 32 and the derricking angle of the boom 32. Hereinafter, condition in which any of a working radius, a lifting height, the slewing angle of the slewing base 31, the length of the boom 32, and the derricking angle of the boom 32 reaches a recording start position, is referred to as "fourth condition". FIG. 13 represents a correspondence between a fourth condition and the digital camera 71 (digital cameras 71A to 71I) activated when the fourth condition is met.

When it is determined that any of the working radius, the lifting height, the slewing angle of the slewing base 31, the length of the boom 32, and the derricking angle of the boom 32 reaches a recording start position (S92: Yes), the controller 50 determines whether a working range flag stored in the storage unit 58 is set to 0 (S93). The value 0 is substituted for the working range flag when the fourth determination process for recording start is performed firstly after any of the working radius, the lifting height, the slewing angle of the slewing base 31, the length of the boom 32, and the derricking angle of the boom 32 reaching the recording start position, and thereafter the value 1 is substituted.

The value 1 is substituted for the working range flag when the fourth determination process for recording start is performed firstly after none of the working radius, the lifting height, the slewing angle of the slewing base 31, the length of the boom 32, and the derricking angle of the boom 32 reaching the recording start position, and thereafter the value 0 is substituted.

When the working range flag is set to 0 (S93: Yes), the controller 50 substitutes the value 1 for the working range flag stored in the storage unit 58 (S94).

The controller 50 transmits an activation signal and a start recording signal to the digital camera 71 (digital cameras 71A to 71I) which is associated with the fourth condition to be stored in the storage unit 58, and cause the relevant digital camera 71 to activate as well as to start storing movie image data captured with the relevant digital camera 71 in the storage unit 58 (S95). However, there is no need to activate the digital camera 71 remained continuously activated and the digital camera 71 having been activated by other conditions being met. In addition, there is no need to start recording image data with the digital camera 71 that has started recording image data by other conditions being met.

The controller 50 synchronizes with a record of image data, starts storing in the storage unit 58, the working radius, the lifting height, the slewing angle of the slewing base 31, the length of the boom 32, and the derricking angle of the boom 32 (S96), and returns the fourth determination process for recording start.

In the process of step S93, when the working range flag is not equal to 0 (S93: No), the controller 50 skips the processes of steps S94 to S96 to return the fourth determination process for recording start.

In the process of step S92, when it is determined that none of the working radius, the lifting height, the slewing angle of the slewing base 31, the length of the boom 32, and the derricking angle of the boom 32 reaches the recording start position (S92: No), the controller 50 determines whether the working range flag stored in the storage unit 58 is set to 1 (S97).

When the working range flag is set to 1 (S97: Yes), the controller 50 substitutes the value 0 for the working range flag stored in the storage unit 58 (S98).

The controller 50 transmits an end signal and a stop recording signal to the digital camera 71 which is associated with the fourth condition to be stored in the storage unit 58 to cause the image data recording to be stopped, deactivates the digital camera 71 as well as stops recording the working radius, the lifting height, the slewing angle of the slewing base 31, the length of the boom 32, and the derricking angle of the boom 32 (S99), and returns the fourth determination process for recording starting. However, there is no need to deactivate the digital camera 71 remained continuously activated. In addition, there is no need to stop recording image data with the digital camera 71 along with other conditions being met.

In the process of step S97, when the working range flag is not equal to 1 (S97: No), the controller 50 skips steps S98 and S99 to return the fourth determination process for recording start.

[Fifth Determination Process for Recording Start]

FIG. 12 is a flowchart illustrating a flow of a fifth determination process for recording start which is performed in step S55 of the determination process for recording start as illustrated in FIG. 7.

In the fifth determination process for recording start, the controller 50 retrieves from the storage unit 58, a driving speed corresponding to the received operation, more specifically the slewing speed of the slewing base 31, a telescopic speed of the boom 32, a derricking speed of the boom 32, or a motion speed of the hook 34, and an upper limit speed for each driving speed to determines whether each driving speed exceeds each corresponding upper limit speed thereof (S101). The upper limit speed for each driving speed is previously stored in the storage unit 58. Hereinafter, condition in which the driving speed corresponding to any of the operations exceeds the corresponding upper limit speed, is referred to as "fifth condition".

FIG. 13 represents a correspondence between the fifth condition and the digital camera 71 (digital cameras 71D, 71E, 71G, and 71H) activated when the fifth condition is met. Specifically, in the fifth condition, each image data of the digital camera 71D, 71E, 71G, and 71H is recorded when the slewing speed of the slewing base 31 exceeds the upper limit speed thereof. Each image data of the digital camera 71G and 71H is recorded when the telescopic speed or the derricking speed of the boom 32, or the motion speed of the hook 34 exceeds the upper limit speed thereof.

When it is determined that any of the driving speeds exceeds an upper limit speed (S101: Yes), the controller 50 determines whether a speed flag stored in the storage unit 58 is set to 0 (S102). The value 0 is substituted for the speed flag when the fifth determination process for recording start is performed firstly after any of the driving speeds exceeding the upper limit speed, and thereafter the value 1 is substituted. The value 1 is substituted for the speed flag when the fifth determination process for recording start is performed firstly after none of the driving speeds exceeding the upper limit speed, and thereafter the value 0 is substituted.

When the speed flag is set to 0 (S102: Yes), the controller 50 substitutes the value 1 for the speed flag stored in the storage unit 58 (S103).

The controller 50 transmits an activation signal and a start recording signal to the digital camera 71 (digital cameras 71D, 71E, 71G, and 71H) which is associated with the fifth condition to be stored in the storage unit 58, and cause the relevant digital camera 71 to activate as well as to start storing movie image data captured with the relevant digital camera 71 in the storage unit 58 (S104). However, there is no need to activate the digital camera 71 remained continuously activated and the digital camera 71 having been activated by other conditions being met. In addition, there is no need to start recording image data with the digital camera 71 that has started recording image data by other conditions being met.

The controller 50 synchronizes with a record of image data, starts storing in the storage unit 58, the lever operation quantity, the engine speed, the hoisted load, and the load factor, which are stored in the storage unit 58, (S105), and returns the fifth determination process for recording start.

In the process of step S102, when the speed flag is not equal to 0 (S102: No), the controller 50 skips the processes of steps S103 to S105 to return the fifth determination process for recording start.

In the process of step S101, when it is determined that none of the driving speeds exceeds an upper limit speed (S101: No), the controller 50 determines whether the speed flag stored in the storage unit 58 is set to 1 (S106).

When the speed flag is set to 1 (S106: Yes), the controller 50 substitutes the value 0 for the speed flag stored in the storage unit 58 (S107).

The controller 50 transmits an end signal and a stop recording signal to the digital camera 71 which is associated with the fifth condition to be stored in the storage unit 58 to cause the image data recording to be stopped, deactivates the digital camera 71 as well as stops recording the driving speed, the hoisted load, and the load factor (S108), and returns the fifth determination process for recording start. However, there is no need to deactivate the digital camera 71 remained continuously activated. In addition, there is no need to stop recording image data with the digital camera 71 along with other conditions being met.

In the process of step S106, when the speed flag is not equal to 1 (S106: No), the controller 50 skips steps S107 and S108 to return the fifth determination process for recording start.

Operational Effects of Embodiment

As described above, in the rough terrain crane 10, the image data recording with the digital camera 71 starts when a predetermined measurement value meets a predetermined condition. The predetermined measurement value is recorded concurrently with this recording. Thus, a situation of an accident occurred during operation may be analyzed at low cost.

More specifically, for example, the image data storing with the digital camera 71 starts when the load factor is measured and reaches 90%. Concurrently, the load factor is also recorded. Thus, for example, when the rough terrain crane 10 topples due to an overload, the recorded image data is analyzed after toppling, and accordingly there are obtained a state of the crane vehicle toppling and a variation in the load factors before and after the toppling.

A spaced state in which the outriggers 25 and 26 leaves the ground, is measured and when the outriggers 25 and 26 are lifted off the ground, the image data recording with the digital camera 71 starts. Concurrently, there are stored the information relating to the spaced state of which the outriggers 25 and 26 leaves the ground, and the load factor. Therefore, when the rough terrain crane 10 topples due to the overload, the recorded image data is analyzed after the accident, and accordingly there are obtained the state of the crane vehicle toppling, the spaced state of the outriggers 25 and 26, and the variation in the load factors before and after the toppling.

An operational orientation and an operation quantity for each of the telescopic operation lever 63, the derricking operation lever 62, and the winch operation lever 64 and an over-hoisting state are measured, and while in the over-hoisting state, when any of the telescopic operation lever 63, the derricking operation lever 62, and the winch operation lever 64 is manipulated to the dangerous side, the image data recording with the digital camera 71 starts. Concurrently, there are recorded the information on whether the over-hoisting state is present and the operational orientation and operation quantity for each of the telescopic operation lever 63, the derricking operation lever 62, and the winch operation lever 64. Therefore, when a hoisted load falls due to over-hoisting, the recorded image data is analyzed after an accident, and accordingly there are obtained the state of the hoisted load falling and the variation in such as the operational orientations and operation quantities for each operation lever as above before and after the accident.

When a working radius, a lifting height, the slewing angle of the slewing base 31, the length of the boom 32, and the derricking angle of the boom 32 each reaches a predetermined distance or angle short of a range end of a permissible working range, the image data recording with the digital camera 71 starts. Concurrently, there are recorded the working radius, the lifting height, the slewing angle of the slewing base 31, the length of the boom 32, and the derricking angle of the boom 32. Therefore, upon contact of the boom 32 with an obstacle, the recorded image data is analyzed after an accident, and accordingly there are obtained the state of the contact of the boom 32 with the obstacle, the working radius, the lifting height, the slewing angle of the slewing base 31, the length of the boom 32, and the derricking angle of the boom 32 before and after the accident.

When the slewing speed of the slewing base 31, a telescopic speed of the boom 32, a derricking speed of the boom 32, or a motion speed of the hook 34 each reaches an upper limit speed thereof, the image data recording with the digital camera 71 starts. Concurrently, there are recorded the slewing speed of the slewing base 31, the telescopic speed of the boom 32, the derricking speed of the boom 32, and the motion speed, the hoisted load, and the load factor of the hook 34. Therefore, when a hoisted load falls due to over-speed, the recorded image data is analyzed after an accident, and accordingly there are obtained the state of the hoisted load falling and a variation in the slewing speeds of the slewing base 31, the telescopic speeds of the boom 32, the derricking speeds of the boom 32, the motion speeds of the hook 34 before and after the accident.

The slewing speed of the slewing base 31, the telescopic speed of the boom 32, the derricking speed of the boom 32, and the motion speed of the hook 34 are calculated based on an operational orientation and an operation quantity for each of the slewing operation lever 61, the telescopic operation lever 63, the derricking operation lever 62, and the winch operation lever 64 and an engine speed.

The rough terrain crane 10 is equipped with the digital camera 71 consisting of nine. The storage unit 58 stores in the storage unit 58, a correspondence between each condition from the first to the fifth, in which image data recording with the digital camera 71 starts, and the digital camera 71 which starts the image data recording when each condition being met. Accordingly, image data is recorded with the only specific camera corresponding to a condition of starting recording with the digital camera 71, which records relevant images and reduces capacity storage and power consumption.

There is no need to newly install a digital camera in order to embody the present invention since the digital camera 71 is installed for a dashboard camera and for capturing bird's-eye view image of the rough terrain crane 10.

Modification of Embodiment

Although the rough terrain crane 10, which includes no jib mounted on the distal end of the boom 32, is employed in the embodiment previously discussed, the rough terrain crane 10 may form the jib thereon. The jib may have a fixed length or may be derrickable and telescopic. Where the jib is installed, as regards the fourth condition, a tilt range of the jib (a range of derricking angle between the boom 32 and the jib) and a telescopic range of the jib can be added to the setting parameters of the permissible working range and the parameters for defining the permissible working range. A tilt angle of the jib and a length of the jib can be recorded concurrently with image data recording.

Where the jib is installed, as is the case in the hook 34, an over-hoisting of hook which is suspended through a rope from a tip of the jib can be incorporated into the condition of starting recording of image data with the digital camera 71. When so configured, a hoisting operation of a sub-winch (a winch for a jib hook), an operation of tilting to a lowered side of the jib, and a jib telescopic operation to a lowered side of the jib can be added as the dangerous side included in the third condition. Such operation quantities can be recorded concurrently with the image data recording.

In the embodiment previously discussed, in order to measure a weight of hoisted load applied to the hook 34, the distortion detector 48 is attached to the derrick cylinder 42 and a load quantity applied to the distortion detector 48 is detected whereby the hoisted load is measured, and alternatively a load sensor, which is operable to directly measure the weight of hoisted load applied to the hook 34, can be installed in the hook 34 or the like.

In the embodiment previously discussed, the rigger uplift sensor 55 detects that any of the outriggers 25 and 26 leaves the ground, and alternatively sensor capable of measuring a clearance may be attached to the outriggers 25 and 26 such that the clearance is recorded after starting recording with the digital camera 71 depending on the second condition.

The invention claimed is:

1. A crane vehicle comprising:
   a carrier;
   a slewing base slewably supported on the carrier;
   a boom supported by the slewing base in a derrickable and telescopic manner;
   a hook which is suspended from a distal end of the boom with a wire therebetween, and is configured to engage with a hoisted load;
   a load detection means for detecting a load being applied to the hook;
   a plurality of digital cameras;
   a storage unit configured to store image data outputted by the digital cameras; and
   a controller,
   wherein the controller performs,
   when a predetermined measurement value meets a predetermined condition, a process of recording start which associates the digital cameras outputting image data to be stored when the predetermined measurement value meeting the predetermined condition with the relevant predetermined condition and starts storing in the storage unit the image data outputted by the digital cameras associated with the predetermined condition, and
   a process of storing measurement value to store the predetermined measurement value in the storage unit concurrently with the process of recording start,
   wherein the predetermined measurement value represents a load factor that is the ratio of the weight of hoisted load detected by the load detection means to the suspendible maximum weight of the hoisted load, and wherein the predetermined condition is that the load factor exceeds a predetermined threshold.

2. The crane vehicle according to claim 1, wherein at least one of the digital cameras is installed as a dashboard camera.

3. The crane vehicle according to claim 1, wherein at least one of the digital cameras is installed for capturing bird's-eye view image of the crane vehicle.

4. A crane vehicle, comprising:
a carrier;
a slewing base slewably supported on the carrier;
a boom supported by the slewing base in a derrickable and telescopic manner;
a hook which is suspended from a distal end of the boom with a wire therebetween, and is configured to engage with a hoisted load;
an outrigger which is disposed on the carrier, and is placed upon the ground so as to cause the carrier to have a stable posture;
a telescopic actuator for extending and retracting the boom;
a derrick actuator for raising and lowering the boom;
a winch actuator configured to operate the wire so as to vertically move the hook;
a boom telescopic operation unit configured to operate the telescopic actuator;
a boom derricking operation unit configured to operate the derrick actuator;
a winch operation unit configured to operate the winch actuator;
a plurality of digital cameras;
a storage unit configured to store image data outputted by at least one of the plurality of digital cameras; and
a controller,
wherein the controller performs,
when a predetermined measurement value meets a predetermined condition, a process of recording start which associates the at least one digital camera outputting image data to be stored when the predetermined measurement value meeting the predetermined condition with the relevant predetermined condition and starts storing in the storage unit the image data outputted by the at least one digital camera associated with the predetermined condition, and
a process of storing measurement value to store the predetermined measurement value in the storage unit concurrently with the process of recording start,
the crane vehicle further comprising an over-hoisting detection means for detecting that a distance of the hook from the distal end of the boom becomes equal to or less than a predetermined length,
wherein the predetermined measurement value represents information on whether the distance of the hook from the distal end of the boom becomes equal to or less than the predetermined length, an operational orientation and an operation quantity for the boom telescopic operation unit, an operational orientation and an operation quantity for the boom derricking operation unit, and an operational orientation and an operation quantity for the winch operation unit, and
wherein, where the over-hoisting detection means detects that the distance of the hook from the distal end of the boom becomes equal to or less than the predetermined length, the predetermined condition includes the operational orientation of the boom telescopic operation unit being an extended orientation of the boom, the operational orientation of the boom derricking operation unit being a lowered orientation of the boom, or the operational orientation of the winch operation unit being a lifted orientation of the hook.

\* \* \* \* \*